United States Patent
Erimli et al.

(10) Patent No.: US 6,957,270 B1
(45) Date of Patent: Oct. 18, 2005

(54) METHOD AND APPARATUS FOR PERFORMING FLOW CONTROL ACROSS MULTIPLE NETWORK DEVICES

(75) Inventors: Bahadir Erimli, Campbell, CA (US); Ian Lam, Fremont, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 820 days.

(21) Appl. No.: 09/760,299

(22) Filed: Jan. 16, 2001

(51) Int. Cl.[7] ............................................. G08F 15/16
(52) U.S. Cl. ...................................... 709/235; 370/235
(58) Field of Search .. 709/23–235, 238; 370/230–235; 710/29

(56) References Cited

U.S. PATENT DOCUMENTS

| | | | | |
|---|---|---|---|---|
| 6,061,357 A | * | 5/2000 | Olshansky et al. | 370/401 |
| 6,115,356 A | * | 9/2000 | Kalkunte et al. | 370/229 |
| 6,170,022 B1 | * | 1/2001 | Linville et al. | 710/29 |
| 6,192,028 B1 | * | 2/2001 | Simmons et al. | 370/229 |
| 6,192,422 B1 | * | 2/2001 | Daines et al. | 710/29 |
| 6,252,849 B1 | * | 6/2001 | Rom et al. | 370/230 |
| 6,405,258 B1 | * | 6/2002 | Erimli et al. | 709/235 |
| 6,456,590 B1 | * | 9/2002 | Ren et al. | 370/229 |
| 6,591,303 B1 | * | 7/2003 | Hendel et al. | 709/238 |
| 6,598,088 B1 | * | 7/2003 | Lynch et al. | 709/238 |
| 6,608,819 B1 | * | 8/2003 | Mitchem et al. | 370/253 |
| 6,628,613 B1 | * | 9/2003 | Joung et al. | 370/230 |
| 6,771,601 B1 | * | 8/2004 | Aydemir et al. | 370/231 |
| 6,816,465 B1 | * | 11/2004 | Barsoum et al. | 370/252 |

* cited by examiner

Primary Examiner—Abdullahi E. Salad
(74) Attorney, Agent, or Firm—Harrity & Snyder, LLP

(57) ABSTRACT

A number of network devices that control the communication of data frames between stations in a network are cascaded together to support a number of network stations. When a first device receives a data frame destined for a port on a second device, the first device transfers the data frame to the second device. The second device stores receive port information transmitted with the data frame and processes the data frame. If the second device identifies a congestion condition associated with processing the data, the second device transmits the receive port information back to the first device. The first device then performs a flow control-related operation on the port identified by the receive port information.

18 Claims, 5 Drawing Sheets

| DA | SA | PORT/<br>DEVICE ID | TYPE/<br>LENGTH | FRAME DATA | FCS |

METHOD AND APPARATUS FOR PERFORMING FLOW CONTROL ACROSS MULTIPLE NETWORK DEVICES

TECHNICAL FIELD

The present invention relates generally to network communications and, more particularly, to flow control across multiple network devices.

BACKGROUND ART

In computer networks, a number of network stations are typically interconnected via a communications medium. For example, Ethernet 802.3 is a commonly used local area network (LAN) scheme in which multiple stations are connected to a shared or dedicated serial data path. These stations often communicate with a switch located between the data path and the stations connected to that path. The switch typically controls the communication of data and includes logic for receiving and forwarding data frames to their appropriate destinations.

When all of the stations connected to the network are simultaneously operating and transmitting data at high speeds, data traffic on the switch may become heavy. Accordingly, some switches implement a flow control scheme using, for example, "pause" frames. In this case, when some sort of congestion on the switch occurs, the switch may transmit a media access control (MAC) control pause frame to one of the stations connected to the switch. The pause frame instructs that station to stop sending data for a period of time.

A network with a large number of stations may use a switch consisting of two or more switch components that may be cascaded together to support all of the stations. A drawback with conventional flow control schemes, such as those using pause frames, is that a switch is unable to selectively suspend data transmissions from network stations that may be connected to a particular switch component without suspending data transmissions from all network stations connected to that switch component. In networks where a number of switches or switch components are cascaded together, such a situation may contribute to congestion-related problems on one or more of the switch components, resulting in reduced data throughput and creating head-of-line blocking.

DISCLOSURE OF THE INVENTION

There exists a need for a device that supports selective flow control across multiple devices. There is also a need for a method of implementing flow control across multiple devices to reduce congestion on the devices.

These and other needs are met by the present invention, where a switch is coupled to a least one other switch. When a first switch receives a frame destined for a port connected to another switch, it forwards the frame to that switch along with receive port information. If a congestion condition is detected on the second switch, the second switch transmits a signal to the first switch indicating the receive port associated with the congestion. The first switch may then perform a flow control-related operation with respect to the receive port.

According to one aspect of the present invention, a method is provided in a system that includes a network device that controls communication of data frames between stations. The method includes receiving a data frame on a first logic component of the network device, identifying receive port information associated with the data frame, the receive port information identifying a port on the first logic component on which the data frame was received, and transmitting the data frame and the receive port information to a second logic component on the network device based on a destination address of the data frame. The method also includes receiving the data frame and receive port information at the second logic component, storing the receive port information on the second logic component, and processing the data frame to generate frame forwarding information. The method further includes transferring the frame forwarding information to an output queue on the second logic component, detecting a condition on the second logic component and transmitting the receive port information associated with the data frame to the first logic component when the condition is detected.

Another aspect of the present invention provides a system that includes a number of devices configured to control communication of data frames between stations. The system includes a first device configured to receive a data frame having a destination address associated with a second device, identify receive port information associated with the data frame, and transmit the data frame and the receive port information to the second device. The system also includes a second device configured to receive the data frame and the receive port information, process the data frame to generate frame forwarding information for the data frame. The second device is also configured to determine whether a congestion condition exists on the second device, where the congestion condition relates to a resource involved in at least one of processing and forwarding the data frame to its destination, and transmit the receive port information associated with the data frame to the first device when the congestion condition exists.

Other advantages and features of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, wherein elements having the same reference number designation represent like elements throughout.

FIG. 5 illustrates the format of a packet transmitted across an expansion port, according to an exemplary implementation consistent with the present invention.

BEST MODE FOR CARRYING OUT THE INVENTION

The present invention will be described with the example of a switch in a packet switched network, such as an Ethernet (IEEE 802.3) network. It will become apparent, however, that the present invention is also applicable to other packet switched systems, as described in detail below, as well as to other types of systems in general.

Switch Architecture Overview

Figure 1:
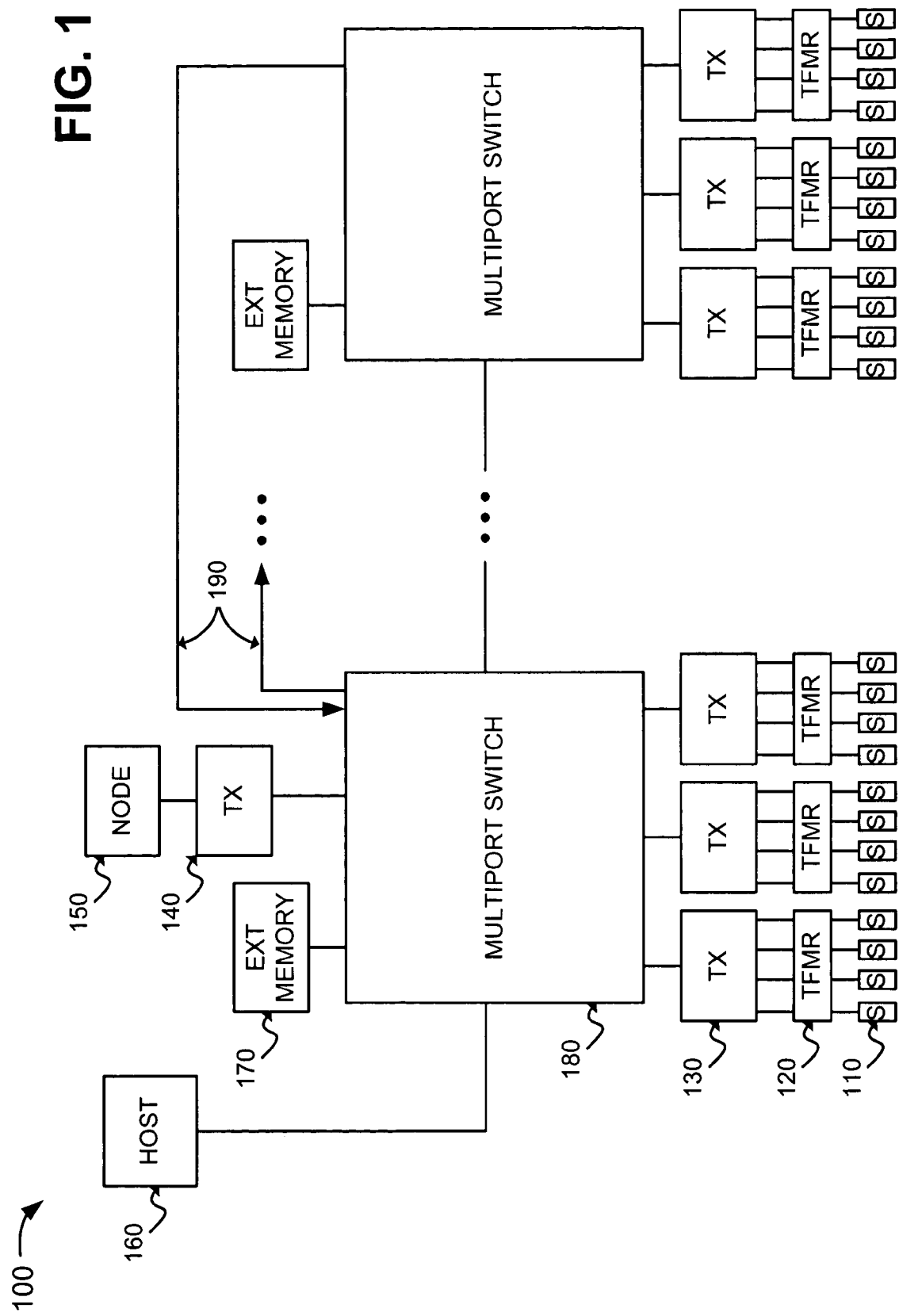
FIG. 1 is a block diagram of an exemplary system in which methods and systems consistent with the present invention may be implemented.

FIG. 1 is a block diagram of an exemplary system in which systems and methods consistent with the present invention may be implemented. The exemplary system may include a packet switched network 100, such as an Ethernet (IEEE 802.3) network. The packet switched network 100 may include network stations 110, transformers 120, transceivers 130 and 140, a network node 150, a host 160, external memories 170, and multiport switches 180. The network stations 110 may include conventional communication devices, such as computers, with different configurations. For example, the devices may send and receive data at network data rates of 10 megabits per second (Mb/s) or 100 Mb/s.

Each 10/100 Mb/s network station 110 may send and receive data to and from a multiport switch 180 according to either a half-duplex or full duplex Ethernet protocol. The Ethernet protocol ISO/IEC 8802-3 (ANSI/IEEE Std. 802.3, 1993 Ed.) defines a half-duplex media access mechanism that permits all stations 110 to access the network channel with equality. Traffic in a half-duplex environment may not be distinguished over the transmission medium. Rather, each half-duplex station 110 may include an Ethernet interface card that uses carrier-sense multiple access with collision detection (CSMA/CD) to listen for traffic on the transmission medium. The absence of network traffic is detected by sensing deassertion of a receive carrier on the transmission medium.

Any station 110 having data to send may attempt to access the channel by waiting a predetermined amount of time, known as the interpacket gap interval (IPG), after deassertion of the receive carrier on the transmission medium. If multiple stations 110 are connected to the same link, each of the stations 110 may attempt to transmit data in response to the sensed deassertion of the receive carrier and after the IPG interval, possibly resulting in a collision. Hence, the transmitting station 110 may monitor the transmission medium to determine if there has been a collision due to another station 110 sending data on the same link at the same time. If a collision is detected, both stations 110 cease transmitting, wait a random amount of time, and then retry the transmission.

The 10/100 Mb/s network stations 110 that operate in full duplex mode may send and receive data packets according to the Ethernet standard IEEE 802.3u. The full duplex environment provides a two-way, point-to-point communication link enabling simultaneous transmission and reception of data packets between each link partner (i.e., the 10/100 Mb/s network station 110 and the corresponding multiport switch 180).

The transformers 120 may include magnetic transformers that provide AC coupling between the network stations 110 and the transceivers 130. The transceivers 130 may include 10/100 Mb/s physical layer transceivers that communicate with the multiport switches 180 via respective serial media independent interfaces (SMIIs) or reduced media independent interfaces (RMIIs). Each of the transceivers 130 may be configured to send and receive data packets between the multiport switch 180 and up to four network stations 110 via the SMII/RMII. The SMII/RMII may operate at a data rate sufficient to enable simultaneous transmission and reception of data packets by each of the network stations 110 and the corresponding transceiver 130.

The transceiver 140 may include one or more 1000 Mb/s (i.e., 1 Gb/s) physical layer transceivers that provide communication with nodes, such as the network node 150, via, for example, a high speed network transmission medium. The network node 150 may include one or more 1 Gb/s network nodes that send and receive data packets at a network speed of 1 Gb/s. The network node 150 may include, for example, a server or a gateway to a high-speed backbone network.

The host 160 may include a computer device that provides external management functions to control the overall operation of the multiport switches 180. The external memories 170 may include synchronous static random access memories (SSRAMs) that provide external storage for the multiport switches 180. Each of the external memories 170 may include a Joint Electron Device Engineering Council (JEDEC) pipelined burst or Zero Bus Turnaround (ZBT) SSRAM having a 64-bit wide data path and a 17-bit wide address path. The external memories 170 may be addressable as upper and lower banks of 128 K in 64-bit words. The size of the external memories 170 is preferably at least 1 Mbyte with data transfers possible on every clock cycle through pipelining.

The multiport switches 180 selectively forward data packets received from the network stations 110 or the network node 150 to the appropriate destination according to the appropriate transmission protocol, such as the Ethernet protocol. The multiport switches 180 may be cascaded together (via lines 190) to expand the capabilities of the multiport switches 180.

Figure 2:
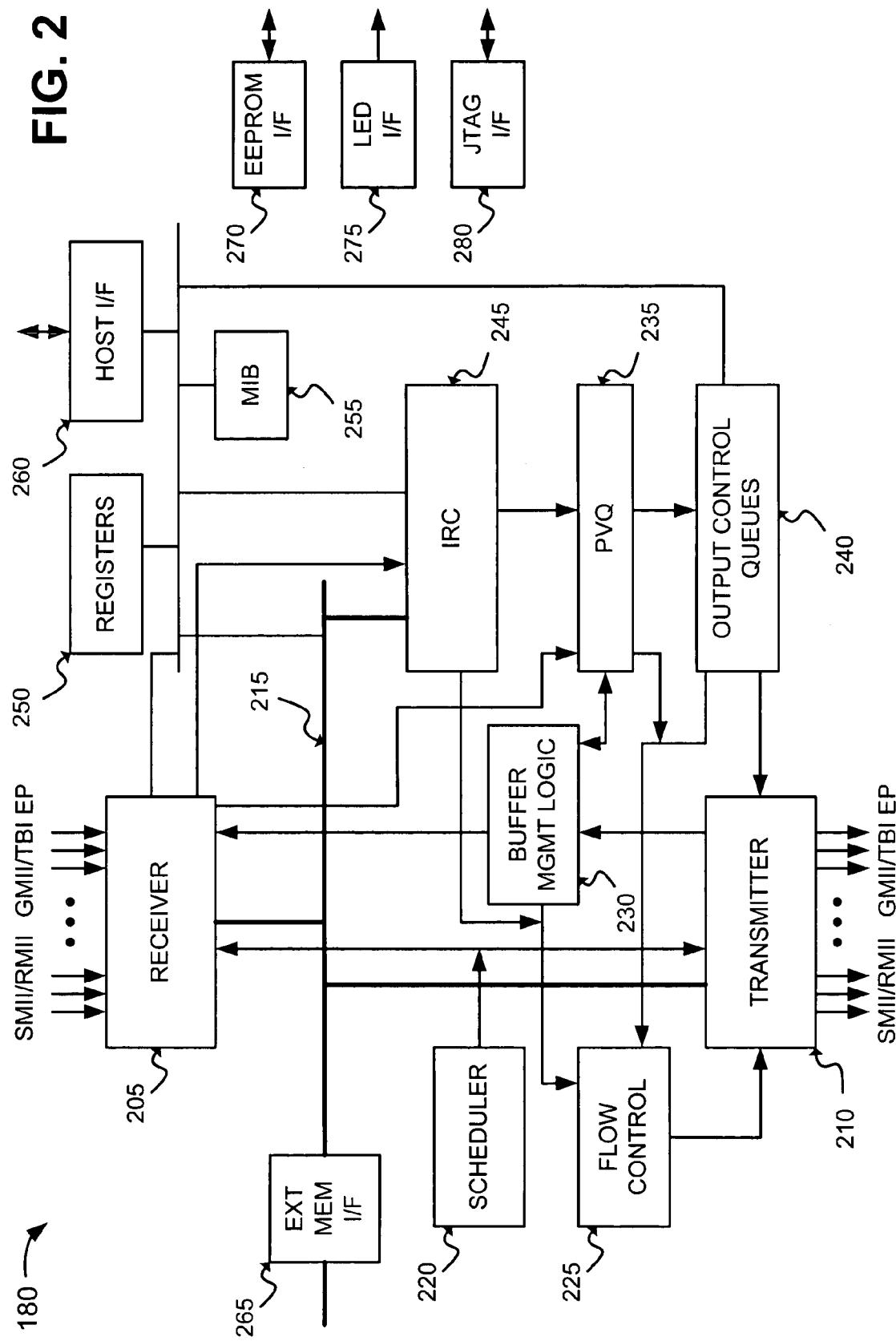
FIG. 2 is an exemplary detailed block diagram of the multiport switch of FIG. 1.

FIG. 2 is a detailed diagram of the multiport switch 180 according to an implementation consistent with the present invention. The multiport switch 180 may include a receiver 205, a transmitter 210, a data bus 215, a scheduler 220, flow control logic 225, buffer management logic 230, a port vector queue (PVQ) 235, output control queues 240, an internal rules checker (IRC) 245, registers 250, management information base (MIB) counters 255, a host interface 260, an external memory interface 265, an EEPROM interface 270, an LED interface 275, and a Joint Test Action Group (JTAG) interface 280.

The receiver 205 may include media access control (MAC) modules and receive buffers, such as first-in, first-out (FIFO) buffers. The receive modules may include input ports that support SMIIs, RMIIs, gigabit media independent interfaces (GMIIs), ten bit interfaces (TBIs), and proprietary interfaces for expansion with other multiport switches 180 (FIG. 1). The expansion ports (EPs) may be used to transfer data between other multiport switches 180 according to a prescribed protocol. The expansion ports may permit the multiport switches 180 to be cascaded together to form a backbone network. Each of the receive modules may include queuing logic that receives data packets from the network stations 110 and/or network node 150 and stores the packets in the corresponding receive FIFOs. The queuing logic may then send portions of the packets to the IRC 245 for processing and to the external memory 170 for storage via the external memory interface 265.

The transmitter 210 may include MAC modules and transmit buffers, such as FIFO buffers. The transmit modules may include output ports that support SMIIs, GMIIs, TBIs, and proprietary interfaces for expansion with other multiport switches 180. Each of the transmit modules may include dequeuing logic that obtains packets from the external memory 170 and stores the packets in the corresponding transmit FIFOs. The transmit modules may read the data packets from the corresponding transmit FIFOs and transmit the packets to the network stations 110 and/or network node 150. In an alternative implementation consistent with the present invention, the functions of the receiver 205 and transmitter 210 may be performed by a transceiver that manages both the receiving and transmitting of data packets.

The data bus 215 may include one or more conductors that connect the receiver 205, the transmitter 210, the IRC 245, and the external memory interface 265. The scheduler 220 may include logic that controls access to the external memory 170 by the queuing and dequeuing logic of the receiver 205 and transmitter 210, respectively. The multiport switch 180 is configured to operate as a non-blocking switch, where network data is received and transmitted from the switch ports at the respective wire rates of 10, 100, or 1000 Mb/s. Hence, the scheduler 220 may control the access by different ports to optimize use of the bandwidth of the external memory 170.

The flow control logic 225 may include logic that operates in conjunction with the buffer management logic 230, the PVQ 235, and the output control queues 240 to control the transmission of packets by the transmitter 210. The flow control logic 225 may control the transmitter 210 so that the transmitter 210 outputs packets in an efficient manner based on the volume of data traffic. The buffer management logic 230 may include logic that oversees the use of memory within the multiport switch 180. For example, the buffer management logic 230 may manage the use of frame pointers and the reuse of frame pointers once the data packet has been transmitted to its designated output port(s). Frame pointers identify the location of data frames stored in the external memory 170 that require transmission.

The PVQ 235 may include logic that obtains a frame pointer to the appropriate output queue(s) in output control queues 240 that correspond to the output ports to receive the data frame transmission. For multicopy frames, the PVQ 235 may supply multiple copies of the same frame pointer to more than one output queue. The output control queues 240 may include a FIFO-type output queue corresponding to each of the transmit modules in the transmitter 210. Each of the output queues may include multiple priority queues for frames having different levels of priority. For example, a high priority queue may be used for frames that require a lower access latency (e.g., frames for multimedia applications or management frames). The frame pointers stored in the FIFO-type output queues may be processed by the dequeuing logic for the respective transmit modules. The dequeuing logic uses the frame pointers to access the external memory 170 to read data frames at the memory locations specified by the frame pointers.

The IRC 245 may include an internal decision making engine that makes frame forwarding decisions for data packets that are received by the receiver 205. The IRC 245 may monitor (i.e., "snoop") the data bus 215 to determine the frame pointer value and a part of the data frame, for example, the header information of a received packet, including the source, destination, and virtual local area network (VLAN) address information. The IRC 245 may use the header information to determine which output port will output the data frame stored at the location specified by the frame pointer. The IRC 245 may, thus, determine that a given data frame should be output by either a single port (i.e., unicast), multiple ports (i.e., multicast), all ports (i.e., broadcast), or no port (i.e., discarded).

For example, each data frame may include a header that identifies the source and destination addresses. The IRC 245 may use the destination address to identify the appropriate output port to output the data frame. The frame header may also include VLAN address information that identifies the frame as information destined to one or more members of a group of network stations 110. The IRC 245 may alternatively determine that a data frame should be transferred to another multiport switch 180 via the expansion port. Therefore, the IRC 245 determines whether a frame temporarily stored in the external memory 170 should be output to a single output port, multiple output ports, no output port, or another multiport switch 180.

The IRC 245 may output its forwarding decision to the PVQ 235 in the form of a forwarding descriptor. The forwarding descriptor may include, for example, a priority class identifying whether the data frame is high priority or low priority, a port vector identifying each output port that should transmit the frame, the input port number, or VLAN information. The PVQ 235 may decode the forwarding descriptor to obtain the frame pointer. The PVQ 235 may then supply the frame pointer to the appropriate output queues within the output control queues 240.

The IRC 245 may also perform layer 3 filtering. For example, the IRC 245 may examine each received data packet for up to 128 programmable patterns and process the packet based on the result. The result may dictate that the IRC 245 drop the packet, forward the packet to the host 160, or assign a user priority or a Differentiated Services Code Point (DSCP) to the packet. User priorities and the DSCP may be independently mapped into output priority classes.

The registers 250 may include configuration and status registers used by the host interface 260. The MIB counters 255 may provide statistical network information in the form of MIB objects for use by the host 160. The host interface 260 may include a standard interface that permits an external management entity, such as the host 160, to control the overall operation of the multiport switch 180. The host interface 260 may decode host accesses within a prescribed register space and read and write configuration and status information to and from the registers 250.

The external memory interface 265 may include a standard interface that permits access to the external memory 170. The external memory interface 265 may permit external storage of packet data in the external memory 170 in a direct memory access (DMA) transaction during an assigned time slot determined by the scheduler 220. In an implementation consistent with the present invention, the external memory interface 265 operates at a clock frequency of at least 66 MHz and, preferably, at a frequency of 100 MHz or above.

The EEPROM interface 270 may include a standard interface to another external memory, such as an EEPROM. The LED interface 275 may include a standard interface to external LED logic. The LED interface 275 may send the status of conditions of the input and output ports to the external LED logic. The LED logic may drive LED display elements that are human-readable. The JTAG interface 280 may include a standard interface to external testing equipment to permit, for example, a boundary scan test to be performed on the multiport switch 180.

The foregoing description of the switch architecture provides an overview of the switch operations in a packet switched network. A more detailed description of the features of the present invention as embodied, for example, in network 100 is provided below.

Flow Control Across Multiple Devices

The present invention is directed to a flow control arrangement that may be implemented across multiple devices, such as a number of multiport switches 180. The present invention may be employed in a system that includes a number of multiport switches cascaded to each other, as illustrated in FIG. 1. Multiport switches 180 illustrated in FIG. 1 may also be referred to as switch components and, in some implementations of the present invention, a number of these switch components may be part of a single multiport switch. When a first multiport switch receives a frame destined for a port coupled to another multiport switch, the first multiport switch transfers the frame to the second multiport switch. The second switch stores receive port information transmitted with the data frame and processes the data frame. If the second switch identifies a congestion condition, the second switch transmits the receive port information to the first switch, which then performs a flow control-related operation.

Figure 3:
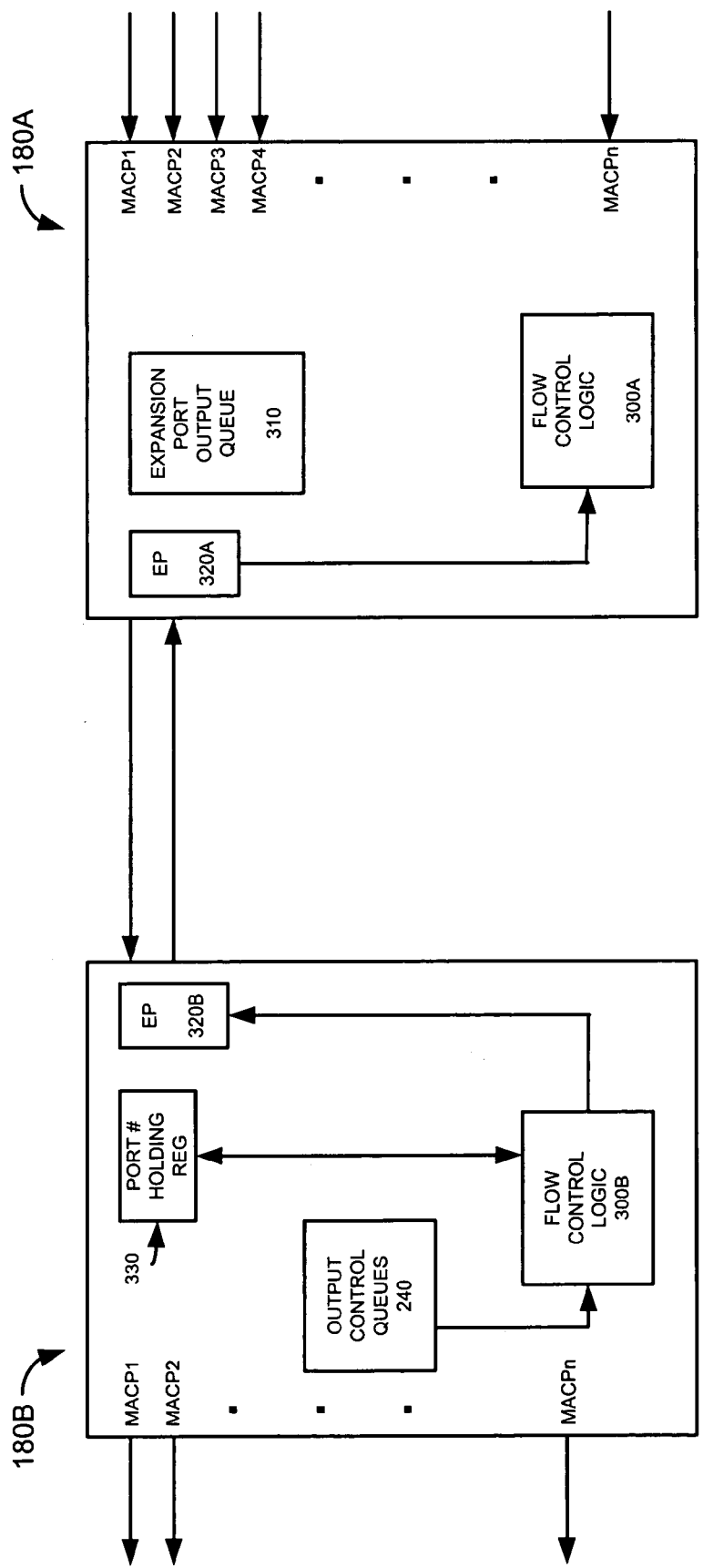
FIG. 3 is a block diagram illustrating an exemplary system consistent with the present invention.

FIG. 3 illustrates an exemplary implementation of the present invention in which two multiport switches, labeled 180A and 180B, are cascaded together. Only two switches are shown for simplicity. It should be understood that additional multiport switches may be cascaded together in implementations of the present invention. The description that follows refers to the devices 180A and 180B as being separate multiport switches. As described previously, it should be understood that devices 180A and 180B may be part of a single multiport switch. In this case, the devices 180A and 180B may be network device components located on the same multiport switch or on the same multiport switch circuit board.

Multiport switch 180A includes flow control logic 300A, a number of MAC receive modules, labeled MACP1–MACPn and corresponding to ports 1 through n, an expansion port output queue (EPOQ) 310 and an expansion port (EP) 320A. It should be understood that multiport switch 180A also includes a number of MAC transmit modules associated with ports P1–Pn (not shown). The flow control logic 300A includes logic for making flow control decisions. Such flow control decisions may include, for example, detecting congestion conditions and generating MAC control pause frames.

The EPOQ 310 stores data frames received via multiport switch 180A whose destination addresses are MAC transmit modules located on multiport switch 180B. For example, assume a data frame received on MACP4 of multiport switch 180A is to be transmitted on output port 2 (i.e., MACP2) of multiport switch 180B. In this case, the data frame may be stored in EPOQ 310. The data frames stored in EPOQ 310 may be forwarded to EP 320A and then transferred to multiport switch 180B. In an exemplary implementation, multiport switches 180A and 180B are cascaded together via EPs 320A and 320B.

Multiport switch 180B includes flow control logic 300B, EP 320B, a port number holding register 330, output control queues 240 and MAC transmit modules, labeled MACP1–MACPn and corresponding to ports 1 through n. It should be understood that multiport switch 180B also includes a number of MAC receive modules associated with ports P1–Pn (not shown) and may include an expansion port output queue (not shown). Flow control logic 300B, as described in more detail below, interacts with data frame processing logic to identify congestion conditions on multiport switch 180B. The port number holding register 330, as described in more detail below, stores port number information relating to the receive port number for data frames received via EP 320B. When a congestion condition occurs, the multiport switch 180B identifies a receive port number associated with the congestion by accessing port number holding register 330. The flow control logic 300B then communicates the "offending" port information (i.e., the port on which the particular data frame associated with the congestion was originally received) to multiport switch 180A, via EP 320B. Multiport switch 180A then performs a flow control-related operation for the offending port.

Figure 4:
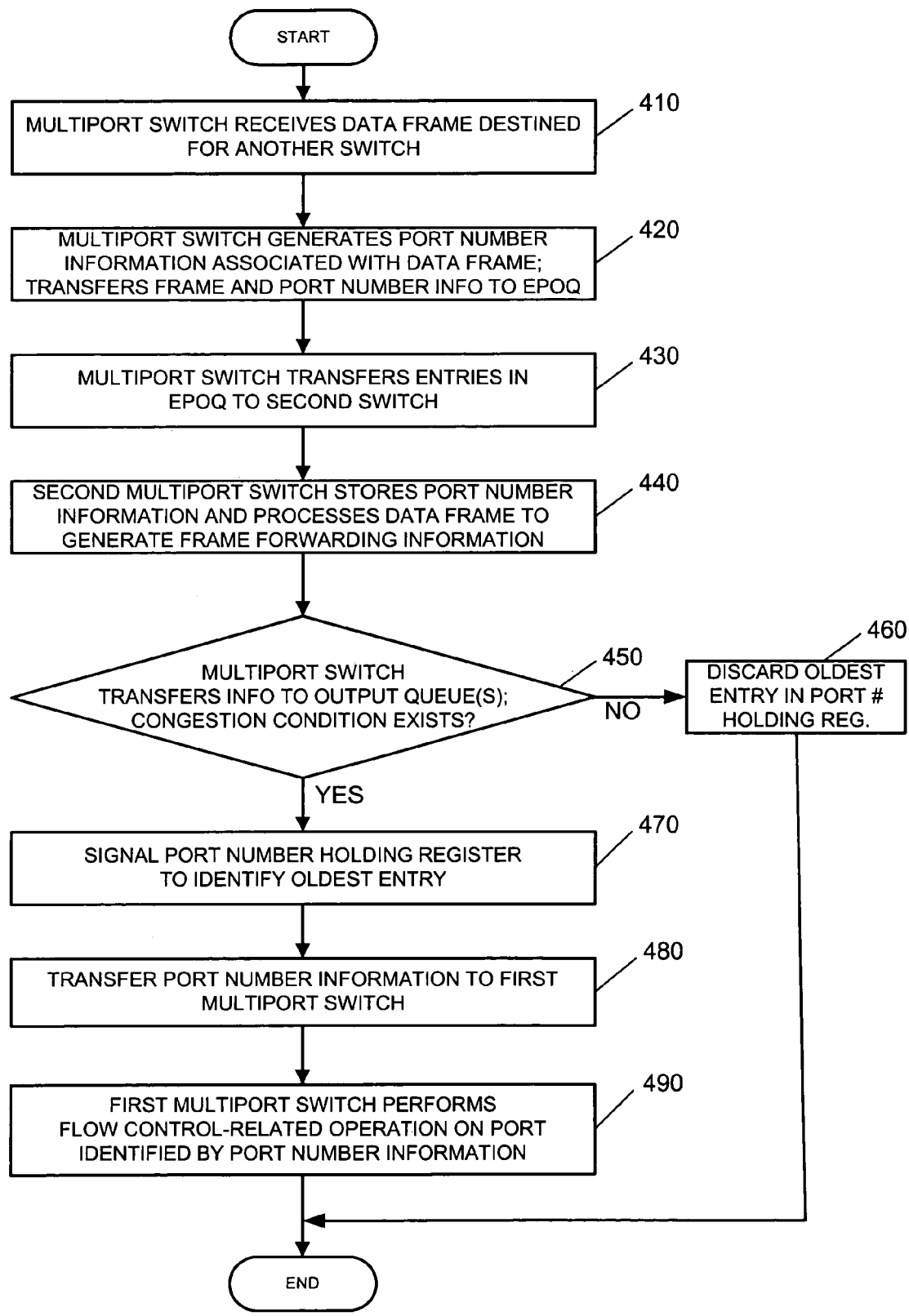
FIG. 4 is a flow diagram illustrating processing for performing flow control between two multiport switches, according to an exemplary implementation consistent with the present invention.

FIG. 4 illustrates exemplary processing for performing flow control between two network switches, such as multiport switches 180A and 180B, in an implementation consistent with the present invention. Processing begins upon start-up of network 100 (FIG. 1). Assume that a number of the network stations 110 are transmitting data to the multiport switches 180A and 180B. Further assume that multiport switch 180A receives a data packet whose destination address is a transmit port on multiport switch 180B [step 410].

In an exemplary implementation consistent with the present invention, the multiport switch 180A generates a port number identifier indicating the port on which the data frame was received [step 420]. For example, suppose that the multiport switch 180A receives a data frame on MACP4 whose destination address is transmit module MACP2 on multiport switch 180B. In this case, the multiport switch 180A generates an identifier corresponding to port 4. The multiport switch 180A then transfers the port number identifier, along with the data frame, to EPOQ 310 [step 420].

FIG. 5 illustrates the format of a packet transmitted across an expansion port, according to an exemplary implementation consistent with the present invention. Referring to FIG. 5, the packet 500 includes the following fields: destination address (DA), source address (SA), port/device identifier (ID), type/length, frame data and frame check sequence (FCS).

The DA field includes the destination address of the received frame and the SA field includes the source address of the received frame. The port/device ID field includes information identifying the receive port number associated with the data frame. That is, the port/device ID field identifies the port on which the data frame was received. In the example described above, the port/device ID field may include information identifying port 4 as the receive port. The port/device ID field may also include information identifying the particular multiport switch on which the frame was received. For example, each multiport switch 180 may include a different device ID that identifies that particular multiport switch. In the example above, the device ID may include information identifying multiport switch 180A.

The type/length field identifies the type of frame and the frame data field includes the actual user data. The FCS field may include a cyclic redundancy check (CRC) code appended to the data frame to allow for error detection.

Multiport switch 180A transfers the entries in EPOQ 310 to multiport switch 180B [step 430]. In an exemplary implementation, multiport switch 180A transfers the entries in EPOQ 310 via EP 320A to EP 320B. After multiport switch 180B receives a data entry, it strips the port number from the port/device ID field and stores the receive port number in the port number holding register 330 [step 440].

The receive port number holding register 330 may be a first-in, first-out (FIFO) buffer that stores a number of entries. The particular size of register 330 may be based on the particular network 100. The multiport switch 180B, consistent with an implementation of the present invention, writes the receive port number information into register 330 in the order in which the data is received on EP 320B. By maintaining the order of the data in register 330 corresponding to the order in which the data frames are received, the multiport switch 180B may identify a port number associated with a congestion condition, as described in more detail below. After storing the receive port number in register 330, multiport switch 180B processes the data frame to generate the frame forwarding information [step 440].

The multiport switch 180B, consistent with the present invention, processes the data frames in the order in which they are received on EP 320B, at least until the time that the frame forwarding information is placed in one of the output control queues 240. By processing the data frames in this fashion, the multiport switch 180B is able to later determine the particular port number associated with a congestion condition.

After generating a frame forwarding decision, multiport switch 180B transfers the frame forwarding information to the appropriate output control queue(s) 240 and determines if a congestion condition exists [step 450]. For example, a "congestion" condition may occur if a resource on multiport switch 180B is unable or almost unable to perform its intended function. A congestion condition may occur, for example, when one of the output queues associated with a particular port is full or is nearly full. Other congestion conditions may occur, for example, when an input queue associated with a particular port in IRC 245 has reached a predetermined number of entries.

If no congestion condition is detected with respect to resources associated with processing the data frame received via EP 320B, multiport switch 180B sends a signal to port number holding register 330 indicating that the oldest entry stored in register 330 may be discarded [step 460]. Assume, however, that a congestion condition with respect to a resource associated with processing the data frame received via EP 320B is detected. For example, assume that the data frame received via EP 320B is forwarded to an output queue that is congested. In this case, the flow control logic 300B sends a control signal to the port number holding register 330 to output the oldest entry stored in register 330 [step 470]. Since the flow of the control portion of the data frames (e.g., the frame header) through the multiport switch 180B mirrors the order in which the receive port numbers are stored in register 330, the oldest entry in receive port number holding register 330 corresponds to the receive port number associated with the congestion condition, i.e., the offending port.

After receiving the control signal from flow control logic 300B, the port number holding register 330 transfers the oldest entry in register 330 to multiport switch 180A, via expansion port 320B [step 480]. It should be understood that the port number information may be transmitted with control information indicating that the particular port number is associated with a congestion condition on multiport switch 180B. Multiport switch 180A receives the port number information, and control information when appropriate, via EP320A and transfers the port number information to flow control logic 300A. The flow control logic 300A then performs a flow control-related operation on the port identified by the receive port number information [step 490]. For example, the flow control logic 300A may generate a MAC control pause frame and transmit the pause frame to the offending port.

For example, if the flow control logic 300A receives information identifying receive port 4 at step 480, flow control logic 300A may generate a conventional MAC control pause frame and transmit the pause frame to the MAC transmit module associated with port 4. In response, the network station 110 coupled to port 4 receives the MAC control pause frame and suspends transmission of data for the period of time indicated in the MAC control pause frame. The flow control logic 300A may perform any number of other flow control-related operations based on the particular network requirements.

Described has been an apparatus and method for performing flow control across a number of devices. One advantage of the present invention is that it enables a network to avoid congestion-related problems regardless of which particular switch experiences a congestion condition. This may result in increased data throughput. Another advantage of the invention is that it allows the network to implement a port-based flow control scheme, thereby limiting the flow control operations to ports associated with the congestion.

Only the preferred embodiments of the invention and a few examples of its versatility are shown and described in the present disclosure. It is to be understood that the invention is capable of use in various other combinations and environments and is capable of modifications within the scope of the inventive concept as expressed herein.

For example, the present invention has been described with the example of two multiport switches 180A and 180B cascaded together. It should be understood, however, that the present invention may be employed in networks including any number of switches cascaded together. It should also be understood that a number of devices similar to devices 180A and 180B may be cascaded together to form a single network device. In addition, the present invention has also been described with a few examples of types of congestion conditions and flow control-related responses. It should be understood that the invention may be employed to identify any number of situations involving congestion and may perform any number of flow control operations, based on the particular network requirements.

What is claimed is:

1. In a system that includes a network device that controls communication of data frames between stations, a method comprising:

receiving a data frame on a first logic component of the network device;

identifying receive port information associated with the data frame, the receive port information identifying a port on the first logic component on which the data frame was received;

transmitting the data frame and the receive port information to a second logic component on the network device, based on a destination address of the data frame;

receiving the data frame and receive port information at the second logic component;

storing the receive port information on the second logic component;

processing the data frame to generate frame forwarding information;

transferring the frame forwarding information to an output queue on the second logic component;

detecting a condition on the second logic component;

transmitting the receive port information associated with the data frame from the second logic component to the first logic component, when the condition is detected;

generating a pause frame by the first logic component in response to receiving the receive port information from the second logic component; and transmitting the pause frame by the first logic component via the port identified by the receive port information.

2. The method of claim 1, wherein the detecting a condition includes detecting a congestion condition associated with a resource involved in at least one of processing and forwarding the data frame on the second logic component.

3. The method of claim 2, wherein the transmitting the pause frame comprises:

transmitting the pause frame via the port identified by the receive port information and not transmitting the pause frame by the first logic component via other ports on the first logic component.

4. The method of claim 1, wherein the transmitting the data frame and the receive port information to the second logic component includes transmitting the data frame and the receive port information together in a single frame, the single frame including a field identifying the receive port information.

5. The method of claim 1, further comprising:

discarding the receive port information associated with the data frame after transferring the frame forwarding information to the output queue, when the condition is not detected.

6. The method of claim 1, wherein the processing and transferring associated with a plurality of data frames are performed in a same order as which the receive port information for the respective plurality of data frames is stored by the second logic component.

7. A network device including a plurality of logic devices coupled together to control communication of data frames between stations, comprising:

a first logic device comprising:
a plurality of ports configured to receive data frames from the respective stations, and
first data frame processing logic configured to:
receive a data frame from a first station, the data frame having a destination address associated with a second logic device,
identify receive port information associated with the data frame, the receive port information identifying a port on the first logic on which the data frame was received, and
transmit the data frame and receive port information to the second logic device; and
a second logic device comprising:
a register configured to store receive port information associated with data frames received from the first logic device, and
second data frame processing logic configured to:
receive the data frame and receive port information,
store the receive port information in the register,
generate frame forwarding information for the data frame,
determine whether a condition exists with respect to a resource involved in processing the data frame, and
send a signal to the register when the condition exists, the signal indicating that the register is to output receive port information associated with the data frame to the first logic device.

8. The network device of claim 7, wherein the condition relates to a congestion condition associated with the resource.

9. The network device of claim 8, wherein the first logic device is further configured to:

receive the receive port information from the second logic device, and perform a flow-control related operation with regard to the port identified by the receive port information.

10. The network device of claim 9, wherein the flow-control related operation comprises transmitting a pause frame via the port identified by the receive port information.

11. The network device of claim 7, wherein the register outputs receive port information corresponding to an oldest entry stored in the register in response to receiving the signal.

12. The network device of claim 7, wherein the second logic device further comprises:

a plurality of output queues corresponding to ports on the second logic device, wherein the second data frame processing logic is further configured to:
output frame forwarding information to one of the plurality of output queues; and
send a second signal to the register when the condition does not exist, the second signal indicating that the register is to discard the receive port information associated with the data frame.

13. The network device of claim 12, wherein the register discards receive port information corresponding to an oldest entry in the register in response to receiving the second signal.

14. The network device of claim 7, wherein the second data frame processing logic processes data frames in a same order as which the corresponding receive port information is stored in the register.

15. A system comprising a plurality of devices configured to control communication of data frames between stations, comprising:

a first device configured to receive a data frame having a destination address associated with a second device, identify receive port information associated with the data frame, and transmit the data frame and the receive port information to the second device; and a second device configured to receive the data frame and the receive port information, process the data frame to generate frame forwarding information for the data frame, determine whether a congestion condition exists on the second device, the congestion condition relating to a resource involved in at least one of processing or forwarding the data frame to its destination, and transmit the receive port information associated with the data frame to the first device when the congestion condition exists, wherein the first device is further configured to:

receive the receive port information from the second device, generate a pause frame requesting suspension of data traffic, and transmit the pause frame via a port identified by the receive port information, without transmitting the pause frame via other ports on the first device.

16. The system of claim 15, wherein the second device comprises:

a FIFO device configured to store receive port information for a number of data frames; and a plurality of output queues corresponding to ports on the second device, the second device being further configured to:

output the frame forwarding information to one of the plurality of output queues, and wherein the second device processes data frames received from the first device in a same order as which the receive port information for the respective data frames is stored in the FIFO device, such that when the frame forwarding information is output to one of the output queues, an oldest entry in the FIFO device relates to the frame forwarding information being output to the output queue.

17. The system of claim 15, wherein the second device comprises:
   a first-in, first-out (FIFO) device configured to store the receive port information for a number of data frames, the second device being further configured to:
   transmit an oldest entry in the FIFO device to the first device when the congestion condition exists.

18. A system comprising a plurality of devices configured to control communication of data frames between stations, comprising:
   a first device configured to receive a data frame having a destination address associated with a second device, identify receive port information associated with the data frame, and transmit the data frame and the receive port information to the second device; and
   a second device configured to receive the data frame and the receive port information, process the data frame to generate frame forwarding information for the data frame, determine whether a congestion condition exists on the second device, the congestion condition relating to a resource involved in at least one of processing or forwarding the data frame to its destination, and transmit the receive port information associated with the data frame to the first device when the congestion condition exists, wherein the second device comprises:
   a first-in, first-out (FIFO) device configured to store receive port information for a number of data frames; and
   flow control logic configured to transmit a signal to the FIFO device when the congestion condition is detected, and wherein
   the FIFO device outputs the receive port information corresponding to a data frame associated with the congestion condition, in response to receiving the signal.

* * * * *